United States Patent [19]

Rammell

[11] Patent Number: 4,703,911
[45] Date of Patent: Nov. 3, 1987

[54] CONCRETE INSERTABLE RETAINER APPARATUS

[76] Inventor: Ray L. Rammell, P.O. Box 2191, Idaho Falls, Id. 83403

[21] Appl. No.: 789,577

[22] Filed: Oct. 21, 1985

[51] Int. Cl.⁴ .............................................. F16M 1/00
[52] U.S. Cl. .................................. 248/677; 248/188.9
[58] Field of Search ........... 248/677, 678, 679, 359 E, 248/346.1, 188.9, 156, 519, 71, 188.1; 52/167

[56] References Cited

U.S. PATENT DOCUMENTS

| | | | |
|---|---|---|---|
| 1,753,722 | 4/1930 | Schaum | 248/677 |
| 2,902,794 | 9/1959 | Ehrgott | 248/188.9 |
| 2,931,463 | 4/1960 | Stansbury | 188/32 |
| 2,933,754 | 4/1960 | Winans | 248/188.9 X |
| 2,968,116 | 1/1961 | Arenson | 248/188.9 |
| 3,126,666 | 3/1964 | Petersen | 248/346.1 |
| 3,138,893 | 6/1964 | Rupar | 248/346.1 |
| 3,190,041 | 6/1965 | Kimball | 248/679 |
| 3,597,893 | 8/1971 | Spanel | 52/707 |
| 3,713,620 | 1/1973 | Tkach | 248/678 |
| 3,815,852 | 6/1974 | May | 248/677 |
| 3,946,990 | 3/1976 | Tanner | 248/156 X |
| 4,354,655 | 10/1982 | Hengst | 248/679 |
| 4,368,864 | 1/1983 | Tobey | 248/188.5 |
| 4,408,940 | 10/1983 | Fischer | 411/258 |
| 4,553,358 | 11/1985 | Deike | 248/519 X |
| 4,582,287 | 4/1986 | DeLeary | 248/519 |

FOREIGN PATENT DOCUMENTS 0576367 10/1977 U.S.S.R. ............................ 248/679

Primary Examiner—Ramon O. Ramirez
Attorney, Agent, or Firm—Trask, Britt & Rossa

[57] ABSTRACT

A concrete insertable and removable retaining device for use in restricting a lateral displacement of oscillatory or reciprocal-based machinery is disclosed. A base structure defining a recess well accessible from the exterior of the base structure is dimensioned to slidably receive and retain the foot of a piece of oscillating equipment or machinery. The base structure includes a bottom planar surface upon which is fixably mounted a shaft-like anchor means. The anchor means is dimensioned to be slidably received and encased within a receiving well drilled into the concrete or other hardened floor surface whereupon the bottom planar surface of the base structure is brought into a contiguous abutment relationship with the floor surface. A foot of the machinery is thereafter inserted within the recess well and retained therein against any type of lateral displacement.

20 Claims, 6 Drawing Figures

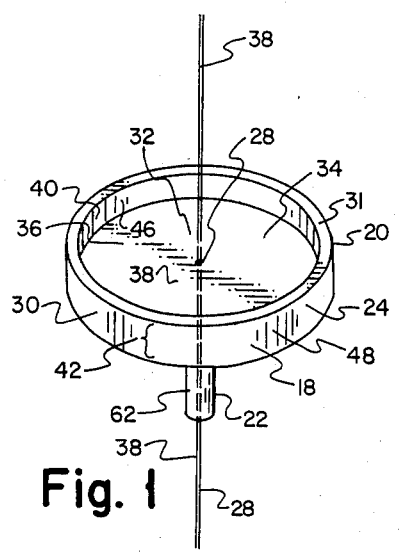

CONCRETE INSERTABLE RETAINER APPARATUS

BACKGROUND OF THE INVENTION

1. Field

This invention is generally directed towards apparatus adapted for retaining machinery in position. More specifically, the invention is directed towards a method and apparatus which may be used to restrict the lateral floor displacement of a machine, which machine incorporates a mechanism which is reciprocal or oscillatory in nature.

2. State of the Art

Presently, there exists in widespread use a variety of heavy-type machinery whose operation generates a considerable amount of internal shock forces. Typically, these shock forces are induced in the machine in its normal course of operation by the motion of reciprocal or oscillatory mechanisms or offset loading within the machine itself. These shock forces tend to produce substantial laterally directed force applications to the machine. These force applications may effect a lateral displacement of the machine when the machine is placed upon a planar or substantially horizontal surface.

The type of machine to which the instant invention is specifically directed is that of a conventional washing machine or clothes dryer as may be typically found in a commercial laundromat or laundry room. It is customary in the art to support machines of this type solely on a plurality of leg-like extensions which extend generally from the corners of the machine vertically downward. Each extension generally terminates in a substantially disk-like foot. The foot includes a planar bottom surface which is typically adapted to contact the underlying floor. Generally, this floor is a hardened surface constructed from concrete or hardwood.

In operating the machine, it may be recognized that this foot-like extension relies solely upon the resistance of the frictional forces generated between itself and the floor in order to oppose any lateral directed force applied to the mass of the machine itself. In operation, lateral forces are typically generated by the turning action of the inner components of the machine or by a load carried within the machine. This turning action has been seen to generate force applications of sufficient magnitude that the entire machine is displaced across the floor. In effect, the machine "walks" across the floor. There exists, therefore, a need for a device which is able to provide an improved method and means for supporting this machine on the hardened floor while at the same time limiting any lateral displacement of the machine across that floor.

Various attempts have been made in the past to provide a method or an apparatus which addresses the problems outlined above. The conventional method or apparatus includes the installation of anchor bolts in a concrete floor. These anchor bolts are positioned in the floor to extend upwardly from the floor surface. The bolts are therefore suitable for the attachment of other structure which may receive and retain the foot of the machine. Typically these bolts are initially positioned in a desired location and concrete thereafter poured around them such that the bolts actually become embedded in the concrete floor. A threaded portion of the bolt is positioned vertically and substantially above the surface of the concrete floor such that a retaining disk-like structure having a recess well therein may be attached to the bolt so as to confine the retaining structure in place. The anchor bolt commonly has a head-like extension on the end of the bolt opposite the threads. This extension has sufficient dimensions that the concrete upon hardening can interact with the head to preclude the bolt from being withdrawn from the concrete floor.

Once the bolt is positioned within the hardened concrete, it is very difficult to remove, and furthermore, it is rigidly retained against any type of lateral movement. Though the anchor bolt does provide a sturdy and rigid means for mounting a retaining cup or other structure, one must consider that the bolt-like extensions are in effect permanently positioned. Furthermore, a portion of the bolt extends rigidly above the floor. Oftimes, in a commercial laundromat, the machines are required to be moved about the floor either for servicing, replacement or relocation. The rigidity of the conventional anchor bolt assemblies precludes or hinders this maneuverability in that typically the bolts are rigified above the surface and, therefore, the machines must be slid around the bolts in order to be moved. The bolt therefore constitutes an obstacle for the movement of any type of machinery across the floor whose path may intercept the location of the extending bolt.

Further, the rigidity of the positioning of the bolt often requires that extreme care be taken in installing the bolt in that once positioned it is nearly impossible to modify or adjust the positioning of the bolt without totally removing the poured concrete and reinstalling the bolt. Given the substantial drying or curing time of the concrete, it is often necessary to provide support structure to hold the bolt in position until the concrete has dried sufficiently to solidly retain the bolt. This support requirement typically necessitates the building of a retaining structure for the bolt to hold it in its assigned position until curing of the concrete is effected.

A modified construction of an anchor bolt is shown in U.S. Pat. No. 4,408,940 (Fischer). Fischer discloses the use of an anchor bolt positioned within a tubular-like casing having a planar bottom. Fischer attempts to avoid the problem of the rigidly positioned bolt by providing a bolt-like member which may be adjusted to accommodate an out-of-center location of the mounting holes in the machinery. Notwithstanding this construction, Fischer's device still provides for a bolt-like member which is extended above the concrete floor and constitutes an obstacle for the movement of any machinery about the floor.

In U.S. Pat. No. 3,597,894 to Spanel, construction in which a bolt-like member is retained through a chain-like means to a tubular casing having a planar bottom is shown. Spanel's device attempts to provide a bolt-like extension which is positionable below the concrete floor prior to the installation of the machine. Upon positioning of the machine, the bolt is extended above the floor through the machine and bolted in place. Thereafter, the retaining casing of the bolt is filled with a hardening material which solidifies and thereafter rigidifies the positioning of the bolt within the casing.

Though Spanel's device does initially avoid the problem of a bolt extension above the surface of the concrete floor, Spanel suggests that the bolt be rigidified in a position above the floor. Therefore, upon final installation, the bolt of Spanel is above the floor and any removal or movement of the machine is complicated by a bolt member which is rigidly extending beyond the surface of the floor.

Another traditional method for securing the foot mounts of an oscillating-type machine to a concrete floor is shown in U.S. Pat. No. 1,753,722 to Schaum. Schaum illustrates a cup-like receiving member which retains a recess well adapted to receive a foot of the machinery. This retaining cup is secured to the floor by means of a plurality of peripheral mounted bolts which are bolted downwardly in a substantially vertical direction into the concrete floor with a screw-like thread engagement of the bolt with the concrete floor. Schaum's construction requires not only the mounting of a plurality of bolts about the periphery of the retaining cup, but should the retaining cup be required to be removed, e.g., for cleaning or moving machinery about the concrete floor, each of the bolts must be removed. It should be remembered that the continual removal and reinstallation of the bolts serve to weaken the bolt mountings and therefore the ability of the retaining cup to be positioned and retained in place. In an alternate construction, Schaum recommends the positioning of recess wells within the floor itself, i.e., a substantially cylindrical-like recess well is drilled into the floor itself permitting the foot of the machine to be received and retained at a position which is below the floor surface.

Alternate constructions as shown by U.S. Pat. No. 3,815,852 to May and U.S. Pat. No. 4,368,864 to Tobey define a structure wherein a receiving chamber having a substantially planar bottom is adapted to receive a foot of the machine. These types of devices rely upon the frictional contact of a planar bottom with the concrete surface so as to preclude any type of lateral movement.

A common practice in laundromats is the placement of a series of washing machines or dryers in substantially linear rows proximate the walls of the laundromat. The machines are positioned substantially against the walls and contiguous or adjacent one another due to economical and spatial considerations. In this typical orientation, access to the rear legs of the machines and hence any retaining apparatus mounted to such legs is all but precluded. The servicing of the machines is also complicated if each individual machine is not readily pulled from its location, i.e., released from its retaining apparatus. A requirement that a user must physically access the retaining apparatus and manipulate it so as to permit the apparatus to release the rear legs of the machine is a serious drawback in these types of machine orientations.

These release and removal considerations are extremely important for those machines which are only serviceable from the rear of the machine. Many retaining apparatus do not permit a specific machine to be removed individually from its location without removing a machine on the side of the subject machine so as to access the rear of the subject machine. This arrangement thus requires all of the machines from the beginning of the respective row of machines to the specific machine to be removed such that that specific machine can be accessed and released from its retaining apparatus to thereafter be serviced. Observably, this removal requirement engenders serious complications involving both time and expense. Recently, attempts have been made to adapt the anchor bolts to address these concerns.

There exists a need for a retaining apparatus which is mountable on a concrete floor while being operable to support a machine on that floor. Further, the retaining apparatus should limit the motion of the machine within limits which are not objectionable in operating and maintaining the machine efficiently. Further, this device should permit an easy release and removal of the machine from the retainer apparatus without requiring the user to access and manipulate the retainer to effect such a release. This device should be relatively simple in construction and therefore easily manufactured. Further, the device should be adapted for easy removal from the floor permitting it to be retrieved so as to permit easy cleaning of the floor while also not hindering the sliding movement of machines about the floor.

In commercial laundromats and similar type installations wherein water, soil and other debris are frequently deposited on the floor, there exists an important requirement to provide a floor surface which permits ease in cleaning. The practice of the prior methods of installing rigid retaining cups on the floor in a sense permanentized those installations such that any cleaning which is done must be done about or around those retainer installations. This often results in the particles of debris, soil, dirt and also a significant amount of water being collected and deposited about the periphery of those cups. Typically, these deposits are not removed during the cleaning operation. This residue, soil and water often serve as a breeding ground for bacteria, fungus and other undesirable conditions.

SUMMARY OF THE INVENTION

The instant invention comprises a mounting or retaining unit for use in supporting a piece of equipment upon a hardened floor surface; e.g., a concrete floor. The mounting unit includes generally two components. First, a receiving means for slidably receiving, retaining and supporting the foot of a piece of equipment; and, secondly, an anchoring means which serves to retain the receiving means securely in place at a predetermined location upon the surface of the concrete floor. The receiving means typically comprises a base structure having a substantially planar bottom. The base structure is fitted with a recess well which extends inwardly toward the interior of the base structure and furthermore is accessible through means of an access port or opening on the surface of the base structure. In a preferred construction, this recess well is substantially cylindrical in shape though other configurations are within contemplation. The recess well extends from the surface of the base structure to the interior of that structure. A central longitudinal axis of that recess well is oriented parallel, if not colinear with the central axis of the base structure itself. The recess well access port is typically positioned opposite the bottom planar surface of the base structure. The recess well is dimensioned to slidably receive a foot of a piece of machinery as well as facilitate a slidable retraction of that foot. The anchoring means may be a shaft-like member which is positioned and fixedly mounted on the planar bottom surface of the base structure and extends outwardly therefrom. The shaft member is typically oriented in an orthogonal orientation with respect to the bottom planar member.

In a preferred construction the shaft member includes a longitudinal axis, which axis is positioned parallel to, if not colinear with, the centroidal axis of the base member. In a preferred construction the longitudinal central axis of the recess well, the base structure and the shaft member are all colinear. The shaft member is dimensioned so as to be slidably received within a receiving well defined within the surface of the floor itself. Typically, this receiving well is defined by drilling a hole into that floor. Further, the shaft member is dimensioned such that upon its insertion within the receiving well in the floor the shaft member is substantially, if not entirely, received within that receiving well such that the bottom planar surface of the base member is brought into a planar abutment against the surface of the concrete floor. In operation, this abutment provides a retaining and receiving member which is positioned essentially contiguous i.e., in an abutment relationship with the concrete floor, thereby orienting a receiving recess well upwardly, which recess well is dimensioned to slidably receive, retain and otherwise support a foot of a piece of machinery. Further, the recess well permits the foot to be easily removed from that well without need of the user accessing the retaining apparatus and manipulating it. The portion of the base structure which defines the walls of the recess well act as retaining surfaces against any displacement of the foot of the machinery in a lateral direction.

The method of installing the instant apparatus consists generally of drilling a hole into the surface of the concrete floor, which hole is dimensioned in length and diameter sufficient to slidably receive the shaft member of the mounting unit. The shaft member of the mounting unit is thereafter slidably inserted into the hole, whereafter the planar bottom portion of the receiving base structure is positioned in a contiguous abutment against the surface of the floor. The foot of the machinery is thereafter inserted within the recess well of the base structure and sufficiently retained within that recess well so as to preclude any extensive lateral displacement of the machine.

BRIEF DESCRIPTION OF THE DRAWINGS

FIG. 1 is a perspective view of the concrete insertable retainer apparatus disclosed by the instant invention;

FIG. 2 is a perspective view of the installation of a concrete insertable retainer apparatus within a floor surface together with the installation of a foot of a piece of machinery therein;

FIG. 3 is a cross-sectional view of the apparatus and accompanying machine and floor surface shown in FIG. 2 along sectional lines 3—3;

FIG. 4 is an exploded view of the prospective view shown in FIG. 2 detailing a retainer unit in association with a foot of a piece od machinery and a floor surface;

DETAILED DESCRIPTION OF THE DRAWINGS

Figure 5:
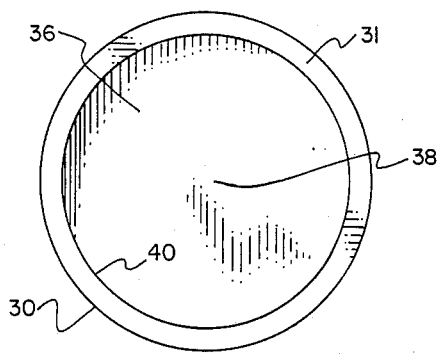
FIG. 5 is a top plan view of a concrete insertable retainer device or apparatus of this invention.
Figure 6:
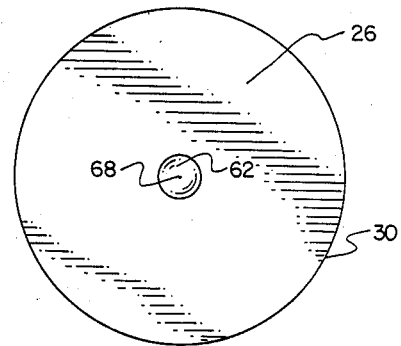
FIG. 6 is a bottom plan view of a concrete insertable retainer apparatus.

An insertable retainer apparatus or mounting unit, generally 18, according to the instant invention includes a receiving means, generally 20, fixably mounted to an anchoring means 22. As shown in FIGS. 1 and 6, receiving means 20 includes a base structure 24 having a planar bottom surface, generally 26.

In the preferred embodiment shown in FIG. 1, base structure 24 is a substantially cylindrical-type member which includes a centroidal axis, generally 28. Base structure 24, as shown, includes a sidewall 30 which extends substantially from a top surface, generally 31, to the bottom planar surface 26. The top surface 31 defines an access port 32 which is positioned essentially opposite the bottom planar surface 26. Access port 32 permits communication from the exterior of base structure 24 with a recess well, generally 36. Recess well 36 is fitted within the interior of base structure 24. As shown, recess well 36 may be substantially cylindrical in configuration and includes a longitudinal axis, generally 38. Longitudinal axis 38 is oriented parallel with longitudinal or centroidal axis 28 of the base structure 24. In a preferred embodiment, longitudinal axis 38 is colinear with longitudinal or centroidal axis 28.

The sidewalls of recess well 36 are defined by the inner sidewalls 40 of base structure 24. As shown, the diameter of recess well 36 over its length is substantially constant; i.e., the length of the diameter connecting opposing portions of sidewall 40 is substantially constant over the height 42 of the base member 24 occupied by the recess well 36. Access port 32 similarly shares a constant diameter with the diameter of the recess well 36. As shown in FIG. 1, the top surface 31 of the retaining member or base structure 24 is substantially a small marginal annular section. The diameter of the recess well 36 and the access port 32 is dimensioned so as to be slightly larger than the diameter of a disk-like foot, generally 52, of a piece of machinery, generally 54, which foot 52 is desired to be positioned within the recess well 36.

As shown in FIGS. 2, 3 and 4, a conventional construction of a piece of machinery 54 involves the positioning of a shaft-like extension 56 within a receiving well 57 of the machinery 54. The shaft 56 may be retained within the receiving well 57 through retaining means 58. Retaining means 58 may include a threaded nut adapted to being mechanically cooperable with threads 59 which are fitted on the shaft 56. Shaft 56 is fixedly mounted on one of its ends to the disk-like foot 52. Disk-like foot 52 typically retains a substantially constant diameter over its height 61. The diameter of the disk-like foot 52 is thereby adapted to be slidably received within the recess well 36 such that the bottom planar portion 60 of the disk-like member 52 is positioned in a substantially contiguous abutment with the flat bottomed surface 34 of the recess well 36. The height of the inner sidewall 40 of the base structure 24 may be varied dimensionally. The sidewall height is varied to correspond with the degree of upward movement of the foot 52 anticipated to be generated by the machine 54; i.e., the height of sidewall 40 is dimensioned so as to be greater than the anticipated upward movement of the foot 52.

The anchoring or retaining means 22, as shown in FIGS. 1 and 3, typically includes a smooth-walled shaft member 62 which is fixedly mounted on the planar surface 26 of base structure 24. Shaft member 62 may be configured in a variety of shapes. As shown in FIG. 1 in a preferred embodiment, shaft 62 may be a substantially cylindrical member, though other configurations such as those having a square or polygonal cross-section, as opposed to a substantially circular cross-section, are contemplated. Shaft member 62 extends outwardly from the planar surface 26 of base structure 24 in a generally orthogonal direction. In a preferred construction as shown in FIG. 3 and FIG. 6, the shaft member 62 includes a longitudinal axis, generally 68, which is oriented substantially orthogonal to the plane, generally 70, of base structure 24. Further, longitudinal axis 68 may be oriented substantially colinear with the centroidal longitudinal axis 38 and longitudinal axis 28 of the recess well 36 and the base structure 24, respectively. Shaft member 62 is dimensioned both diametrically and in length so as to be retained within a receiving well, generally 72, which is defined within the concrete floor surface, generally 74.

As shown in FIGS. 3 and 4, receiving well 72 may be a substantially cylindrical configured space which includes a longitudinal axis, generally 76, which extends substantially orthogonal to the plane of floor surface 74 vertically and downwardly into said floor surface 74. As shown in FIG. 3, receiving well 72 is preferably of sufficient depth so as to receive therein the entire structure of shaft member 62 and thereby bring into abutment the bottom planar surface 26 of the base structure 24 and the portion of the floor surface 74 proximate the receiving well, generally 78. Preferably, the end surface 66 of shaft 62 is positioned slightly above or in minimal contact with the floor 69 of recess well 72. Receiving well 72 may be constructed within the surface of concrete floor 74 by drilling or by other means conventionally known in the art.

The base structure 24 and shaft or anchoring means 22 may be fabricated from a variety of materials. Specifically, these members may be constructed from metallic materials such as steel, stainless steel, or similar materials. Alternately, the invention may be constructed from a variety of plastic-type materials such as polyvinyl chloride or similar synthetic materials.

FIG. 4 illustrates a method of securing a foot, generally 52, of the piece of machinery 54 within a retaining unit, generally 18, which retaining unit 18 is secured against lateral displacement along a concrete floor surface or similar hardened floor surface 74. As shown, first an aperture or receiving well, generally 72, is constructed within the floor surface 74 itself. This receiving well 72 may be constructed by drilling a cylindrical or other shaped configured hole within the surface of floor surface 74. Recess well 72, in a preferred construction, is a cylindrically configured well having a longitudinal axis 76, which axis may extend substantially orthogonal to the plane 80 of floor 74. Though a cylindrical receiving well is preferred, other configurations are also suitable; e.g., well having square, polygonal or oval cross-sections.

Upon receiving well 72 being formed within said floor 74, an apparatus, defined generally as a retaining unit 18, is positioned such that its anchor means 22, i.e., shaft member 62 is inserted within the receiving well 72 such that the bottom planar surface 26 of the base structure 24 is brought into a contiguous abutment against the portion 78 of floor 74 which is positioned about the periphery or perimeter of the recess well 72. Thereafter, the foot 52 of machine 54 is inserted within the recess well 36 of the receiving means 20 and brought into a contiguous abutting relationship with the floor 34 of recess well 36. Thereafter, the forces which are generated by the downward force application of the machinery's 54 weight against the receiving means 20 and, furthermore, against the portion 78 of the floor 74 are balanced by normal forces generated by the normal reactive forces generated by the floor 74. Upon the application of an internally generated force to the machine 54, which force includes a component which is directed substantially horizontally as indicated, for example, by the arrow 86, that horizontal force is resisted by the sidewalls 40 of retaining unit 18 acting against the sidewall portions 90 of the foot 52. More specifically, a displacement of the foot 52 in a lateral direction brings sidewall 90 into abutment against sidewall 40 of base structure 24. The continued force application against the sidewall 40 operates to apply a force through intermediation of the sidewalls 94 of the shaft member 22 against the sidewalls 96 of recess well 72. Normal forces generated along the surface of sidewall 96 of the receiving well 72 contribute to contain the shaft member 62 from any lateral displacement.

The retainer or mounting unit, generally 18, is adapted to be not only slidably inserted within receiving well 72, but furthermore is adapted to be slidably retracted without the use of tools from the receiving well 72 so as to permit the user to remove the mounting unit 18 for purposes of cleaning floor 74. For example, upon removal of mounting unit 18, floor 74 may thereafter be flooded with a cleaning solvent or other reactant to cleanse the surface. Upon the solvent being dried from the surface 74, the shaft member 22 of retaining unit 18 is thereafter slidably reinserted within receiving well 72. In other applications, the mounting unit 18 may be removed from its receiving well 72 so as not to present an obstacle to the sliding or other movement of the machine 54 about the surface of floor 74; e.g., for moving or rearranging the location of the machine 54.

Those skilled in the art will recognize that the embodiments hereinbefore discussed are illustrative of the general principles of the invention. The embodiments herein described are not intended to limit the scope of the claims which themselves recite what applicant regards as his invention.

I claim:

1. A mounting releasably supporting a foot of a piece of equipment upon a floor surface, said floor surface defining a vertically positioned receiving well having a bottom and a depth, said mounting comprising:
    a receiving means for slidably receiving, supporting and retaining a foot of a piece of equipment; and
    an anchoring means for releasably anchoring said receiving means to said floor surface, said anchoring means having a length fixedly mounted to said receiving means and
    extending outwardly therefrom, said anchoring means being slidably received and retained within said receiving well defined within the surface of said floor wherein said anchoring means length is dimensioned to be less than said receiving well depth wherein said anchoring means does not contact said receiving well bottom;
    wherein upon a slidable, insertion of said anchoring means into said floor receiving well, said receiving means is brought into abutment against said floor surface and upon the positioning of said foot of said equipment into said receiving means, said anchoring means operates to restrict a displacement of said receiving means about said floor surface;
    wherein said receiving means may be retracted from said floor receiving well by slidingly pulling said anchoring means upwardly.

2. A mounting unit according to claim 1 wherein said receiving means comprises a base structure having an exterior surface, and further having a recess well therein accessible from the exterior of said base structure, said recess well being dimensioned to slidably receive a foot of said piece of equipment.

3. A mounting unit according to claim 2 wherein said recess well is a cylindrical channel having a longitudinal axis, which longitudinal axis is positioned essentially orthogonal to a plane of said floor surface when said mounting unit is positioned for use on said floor surface.

4. A mounting unit according to claim 3 wherein said recess well comprises an cylindrical channel wherein a diameter of said channel is dimensionally larger than a diameter of said foot of said equipment.

5. A mounting according to claim 2 wherein said base structure is cylindrical in configuration.

6. A mounting according to claim 5 wherein said cylindrical base structure includes a longitudinal axis which longitudinal axis is positioned orthogonal to said surface of said floor when said mounting unit is positioned for use within said floor surface defined receiving well.

7. A mounting according to claim 1 wherein said receiving means includes an planar surface adapted to abut against said floor surface upon said anchoring means being inserted into said floor surface defined receiving well.

8. A mounting according to claim 7 wherein said anchoring means is a shaft member including a longitudinal axis, said axis being directed orthogonal to the plane of said planar surface of said receiving means.

9. A mounting according to claim 8 wherein said shaft member has smooth sidewalls.

10. A mounting according to claim 9 wherein said shaft member is mounted proximate a central longitudinal axis of said base structure.

11. A mounting according to claim 9 wherein said shaft member is fabricated from plastic.

12. A mounting according to claim 11 wherein said base structure is fabricated from plastic.

13. The mounting of claim 1 wherein said anchoring means is retracted without the use of tools.

14. The mounting according to claim 1 wherein said anchoring means in a shaft member.

15. A mounting supporting a washing machine upon a concrete floor surface, said floor surface having a vertically positioned receiving well positioned therein; said receiving well having a depth and a bottom; said mounting comprising;
a plastic base member having a recess well accessible from without said base member, said recess well being dimensioned to slidably receive, support and retain a foot of a washing machine, said base member having a planar bottom surface; and
a smooth walled, plastic shaft member fixedly mounted on said bottom surface of said base member, said shaft member having a length and an end; said shaft member extending orthogonally from the plane of said bottom surface, said shaft member being dimensioned to be slidably received within a receiving well defined within said concrete floor, said shaft member length being dimensionally smaller than said depth of said receiving well, wherein said shaft member end does not contact said receiving well bottom;
wherein upon said shaft member being slidably inserted into said receiving well under the force of gravity, said bottom surface of said base member is brought into abutment against said floor surface thereby orienting said recess well to receive and support a foot of said washing machine;
wherein said shaft member is retractable from said floor surface receiving well by slidably pulling said shaft member upward without a use of tools.

16. The mounting according to claim 15 wherein said shaft member is mounted proximate a central axis of said base member.

17. The mounting according to claim 16 wherein said recess well is cylindrical in shape.

18. The mounting according to claim 17 wherein said shaft member is cylindrical in shape.

19. A mounting supporting a washing machine upon a concrete floor surface, said floor surface having at least one vertically oriented, cylindrical receiving well therein, said receiving well having a depth and a bottom, said mounting comprising:
a plastic cylindrical base member having a flat planar bottom surface, said base member having a cylindrical recess channel therein, accessible from without said base member, said recess well being dimensioned to slidably receive and support a foot of a washing machine; and
a smooth walled cylindrical plastic shaft member, having a length, fixedly mounted centrally on said planar bottom surface of said base member and extending orthogonally from said bottom surface, said shaft member being dimensioned to be slidably received within said cylindrical receiving well defined within said concrete floor surface, under a force of gravity, said shaft member length being dimensioned to be less than said receiving well depth, said shaft member being spatially separated from said receiving well bottom when said shaft member is installed in said receiving well;
wherein upon an insertion of said smooth shaft member into said floor surface receiving well, said bottom planar surface of said base member is brought into abutment against said floor surface and said base member functions to slidably receive a foot of a washing machine and support and retain said foot of said machine;
wherein said shaft member is slidably retractable from said floor receiving well by slidably pulling said shaft member upward without a use of tools.

20. A method for installing a washing machine in a hard floor surface; said method comprising:
drilling a vertical hole, having a depth and a bottom in said floor surface slidably inserting a smooth walled shaft into said vertical hole by the force of gravity wherein said shaft is fixedly mounted to a recess well fitted base structure; said shaft having a length and an end, wherein said length is dimensionally less than said hole depth such that upon said shaft being inserted into said hole, said end is spatially separated from said hole bottom;
slidably inserting a foot of said washing machine into said recess well;
wherein said shaft is retractable from said vertical hole without a use of tools.

* * * * *